United States Patent [19]
Levi et al.

[11] Patent Number: 5,768,460
[45] Date of Patent: Jun. 16, 1998

[54] LOW SKEW OPTICAL FIBER RIBBONS

[75] Inventors: Anthony Frederick John Levi, Los Angeles, Calif.; Markus A. Giebel; Donald L. Knasel, both of Hickory, N.C.; Greg A. Lochkovic, Newton, N.C.

[73] Assignee: Siecor Corporation, Hickory, N.C.

[21] Appl. No.: 538,311

[22] Filed: Oct. 3, 1995

[51] Int. Cl.$^6$ ................................. G02B 6/44
[52] U.S. Cl. ................ 385/114; 385/113; 385/59
[58] Field of Search ................... 385/114, 113, 385/59

[56] References Cited

U.S. PATENT DOCUMENTS

| | | | |
|---|---|---|---|
| 4,138,193 | 2/1979 | Olszewski et al. | 385/114 |
| 4,185,887 | 1/1980 | Ferrentino | 385/114 |
| 4,190,319 | 2/1980 | Eggleston | 385/114 |
| 4,289,558 | 9/1981 | Eichenbaum et al. | 156/179 |
| 4,401,361 | 8/1983 | Slaughter | 385/114 |
| 4,478,488 | 10/1984 | Bagley | 385/104 |
| 4,676,591 | 6/1987 | Driskel | 385/114 |
| 4,679,897 | 7/1987 | Driskel | 385/114 |
| 4,724,024 | 2/1988 | Fan Der Velde et al. | 156/181 |
| 4,737,215 | 4/1988 | Stoffels et al. | 385/114 |
| 4,950,357 | 8/1990 | Sedlmayr | 385/114 |
| 5,076,881 | 12/1991 | Ferguson | 156/436.179 |
| 5,222,179 | 6/1993 | Auteri | 385/114 |
| 5,459,804 | 10/1995 | Stowe | 385/114 |
| 5,514,837 | 5/1996 | Kenny et al. | 174/113 |
| 5,524,164 | 6/1996 | Hattori et al. | 385/114 |
| 5,561,730 | 10/1996 | Lochkovic et al. | 385/114 |
| 5,568,576 | 10/1996 | Takai et al. | 385/23 |

FOREIGN PATENT DOCUMENTS 0194891 9/1986 European Pat. Off.

OTHER PUBLICATIONS

"Types of Fibers" by Jeff Hecht, Understanding Fiber Optics, pp. 68–71 (1987).

"Optical Parallel Interconnection Based on Group Multiplexing and Coding Technique", IEICE Trans. Electron., 1994, E77–C, pp. 35–41, Tetsuo Horimatsu, Nobuhiro Fujimoto, Kiyohide Wakao and Mitsuhiro Yano Jan. 1994.

"Multimode Theory of Graded–Core Fibers", The Bell System Technical Journal, vol. 52, No. 9, Nov. 1973, pp. 1563–1578, D. Gloge and E.A.J. Marcatili.

"Impulse Response of Fibers With Ring–Shaped Parabolic Index Distribution", The Bell System Technical Journal, vol. 52, No. 7, Sep. 1973, pp. 1161–1168, D. Gloge and E.A.J. Marcatili.

"Low skew multimode ribbon fibres for parallel optical communication", Electronics Letters 13 Oct. 1994, vol. 30, No. 21, pp. 1784–1786, S. Siala, A.P. Kanjamala, R.N. Nottenburg and A.F.J. Levi.

"MT Multifiber Connectors and New Applications", Proceedings of 44th Electronic Components & Technology Conference 1994, pp. 994–999, Toshiaki Satake, Toru Arikawa, P. William Blubaugh, Craig Parsons and Toshi K. Uchida May, '94.

(List continued on next page.)

*Primary Examiner*—John D. Lee
*Assistant Examiner*—Ellen E. Kang
*Attorney, Agent, or Firm*—K. McNeill Taylor, Jr.

[57] ABSTRACT

An optical fiber ribbon comprising a plurality of optical fibers secured or embedded substantially parallel to one another, fibers are selected and processed such that the skew in optical propagation time for signals transmitted over said plurality of optical fibers is minimized. The optical fibers are selected from the same pull and each of said optical fibers has a modal bandwidth greater than or equal to 800 Mhz.km at an operating wavelength of 1300 nm. The invention extends the practical applications of optical fiber ribbons to include synchronous parallel transmission with an aggregate data-rate×distance product of greater than 10 Gbit/sec.km.

15 Claims, 4 Drawing Sheets

OTHER PUBLICATIONS

"Antistatic Agents" by J.L. Rogers, Modern Plastics Encyclopedia, p. 144 (1989).

"200-Mb/s/ch 100-m Optical Subsystem Interconnections Using 8-Channel 1.3-μm Laser Diode Arrays and Single-Mode Fiber Arrays", Journal of Lightwave Technology, vol. 12, No. 2, Feb. 1994; pp. 260-269, A. Takai, T. Kato, S. Yamashita, S. Hanatani, Y. Motegi, K. Ito, H. Abe and H. Kodera.

"A System Design Perspective on Optical Interconnection Technology", AT&T Technical Journal, 1993, 72, No. 5, pp. 37-49, Ronald A. Nordin and Anthony F.J. Levi Sep., '93.

LOW SKEW OPTICAL FIBER RIBBONS

BACKGROUND OF THE INVENTION

This invention relates to optical fiber ribbons. Optical members within the ribbons are equivalently called optical fibers or light waveguides herein.

Advanced laser-based parallel optoelectronic transceivers are being promoted as high-density, high-throughput solutions to interconnect bottlenecks in future switching and computing systems. Low-cost fiber-optic links may preferably use multimode fiber with a 50 μm or 62.5 μm diameter graded index core, as this results in relaxed optical alignment tolerances as well as more robust fiber splices and connector components.

Parallel optical links require optical channels that have a low interchannel dispersion among arrival times for simultaneous pulses on the constituent fibers. This spreading between pulses on different optical fibers in a link is due to differences in signal propagation time between the optical fiber channels and is commonly referred to as skew. Skew is the maximum difference in signal propagation time between any pair of channels in the ribbon. Parallel module makers have a skew budget for the module which includes fiber skew, electronics skew, and device skew. Minimization of fiber ribbon skew allows the system designer to allocate a greater portion of the system skew budget to the electronics and/or allows the link to operate over a greater distance and/or at a greater signaling rate for a given link length. Skew is an important factor in determining the maximum rate of synchronous parallel data transmission. Skew of approximately 10 psec/m has limited applications for parallel links.

Skew may result from physical length differences in the optical fibers or differences in propagation speeds along the fibers. Differences in propagation speed result from variation in the effective refractive index of individual fibers. A measure of the effective refractive index is the fiber numerical aperture. Unfortunately, the precision in measurement of fiber numerical aperture using current technology is insufficient. Thus, a surrogate for numerical aperture is required.

The length tolerances among the optical fiber channels are minimized by assembling fibers in the form of a ribbon. Recently it was reported that interchannel skew in an optical fiber ribbon may be reduced to 2.1 psec/m skew across an 8-fiber single-mode fiber ribbon. Takai et al., "200 Mb/s/ch 100-m Optical Subsystem Interconnectors Using 8-Channel 1.3 μm Laser Diode Arrays and Single-Mode Fiber Arrays", Jnal. of Lightwave Technology, Vol. 12, No. 2, Feb. 1994.

A need exists for continued reduction in skew, and for a low skew optical fiber ribbon.

SUMMARY OF THE INVENTION

The present invention provides a practical solution to the need for reduced skew. One embodiment of the present invention is directed to an optical fiber ribbon comprising a plurality of optical fibers, said optical fibers being secured or embedded substantially parallel to one another, wherein said fibers are selected and processed such that the skew in optical propagation time for signals transmitted over said plurality of optical fibers is less than 1.0 psec/m.

Another embodiment of the present invention is directed to an optical fiber ribbon comprising a plurality of optical fibers, said optical fibers being secured or embedded substantially parallel to one another, wherein said optical fibers are selected from the same pull to minimize the skew in optical propagation time for signals transmitted over said plurality of optical fibers.

A further embodiment of the present invention is directed to an optical fiber ribbon comprising a plurality of optical fibers, said optical fibers being secured or embedded substantially parallel to one another, wherein said optical fibers are selected from the same pull to minimize the skew in optical propagation time for signals transmitted over said plurality of optical fibers, and wherein each of said optical fibers is multimode and has a modal bandwidth greater than or equal to 800 Mhz.km at an operating wavelength of 1300 nm.

Yet another embodiment of the present invention is directed to an optical fiber ribbon wherein the skew in optical propagation time for signals transmitted over the ribbon fibers is minimized by means of at least one reinforcing member secured or embedded on either side of said plurality of optical fibers, wherein said at least one reinforcing member comprises a secondary optical fiber having dimensions and tensile modulus substantially similar to that of said plurality of optical fibers. Stress in the ribbonization process may be minimized by means of an external coating on each optical fiber comprising an antistatic material, said antistatic material comprising a quarternary ammonium compound. Stress-induced effects due to ribbon formation, cabling and handling may be minimized by subjecting the optical fibers to controlled payoff stress during ribbon formation.

Another embodiment of the present invention is directed to at least one multi-fiber connector attached to the end of said ribbon, wherein the offset between the axis of the ribbon and the axis of the connector is less than two degrees to minimize the skew in optical propagation time for signals transmitted over the connectorized ribbon fibers.

BRIEF DESCRIPTION OF THE DRAWINGS

Preferred embodiments of the invention are described in the drawings, in which.

DETAILED DESCRIPTION OF THE INVENTION

The present invention will now be described more fully hereinafter with reference to the accompanying drawings, in which one or more preferred embodiments of the invention are shown. This invention may, however, be embodied in many different forms and should not be construed as limited to the embodiments set forth herein; rather, these embodiments are provided so that the disclosure will fully convey the scope of the invention to those skilled in the art. The drawings are not necessarily drawn to scale but are configured to clearly illustrate the invention.

The optical fiber used in this description is manufactured by Corning Incorporated, Centerway, Corning, N.Y. 14831, ribbonized by Siecor Corporation, 489 Siecor Park, Hickory, N.C. 28603, and terminated using MT connectors by US Conec. Ltd., 915 Tate Blvd. S.E., Hickory, N.C., 28603. An n-fiber ribbon may be formed by selecting n lengths of fiber sequentially from a single pull or draw from an optical fiber preform. Typically, to achieve manufacturing efficiency, n-fiber ribbons are formed from n long lengths (2.2 km or more) of optical fiber without specific concern for the manufacturing history of the various fiber lengths. We have found that refractive index profile variation, and hence optical signal propagation skew, can be reduced by selecting the n-fibers from a single pull from an optical preform. The shorter the lengths of the n-fibers, the more similar their manufacturing history and therefore the more similar their refractive index profiles.

Figure 1:
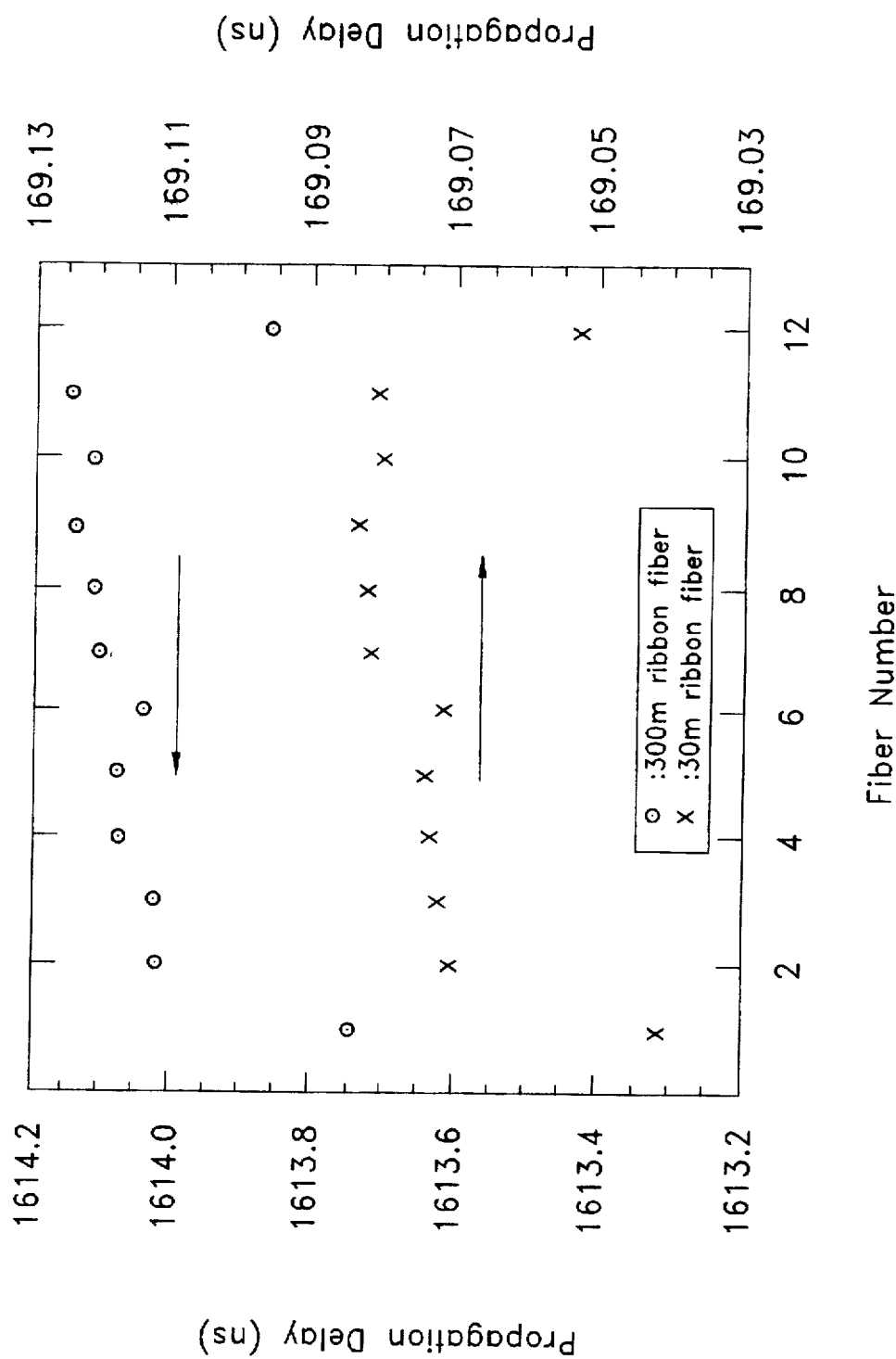
FIG. 1 is a graph depicting skew in a 12-fiber optical fiber ribbon in the absence of edge reinforcing members.

FIG. 1 shows measured optical delay after transmission of $\lambda=1.3$ μm wavelength radiation through a 300 m and 30 m length of 12-fiber ribbon of 62.5 μm core graded index multimode optical fibers. The optical delay is significantly different for fiber 1 and fiber 12 than for the inner 10 fibers, due to stress at the edge of the ribbon. Thus, skew can be further minimized using fiber 1 and fiber 12, formed of the same material as fibers 2 through 11, as reinforcing outer members to minimize stress across the fiber array due to the ribbonization process. These edge fibers will have the same dimensions and materials properties, e.g., tensile modulus, as the middle ten optical fibers which are between the edge optical fibers. Fibers which have been rejected for use as light waveguides, for example due to high attenuation or low bandwidth, may be used as the reinforcing members to minimize expense.

Tension feed-back and control of fiber payoff during the ribbonization process may be used to create a stress profile which results in low skew ribbon and cable without the use of reinforcing outer members. Conventional ribbonization processes and equipment may be used, such as those described in U.S. Pat. Nos. 4,289,558 and 4,724,024 or European Patent 0,194,891.

Figure 2:
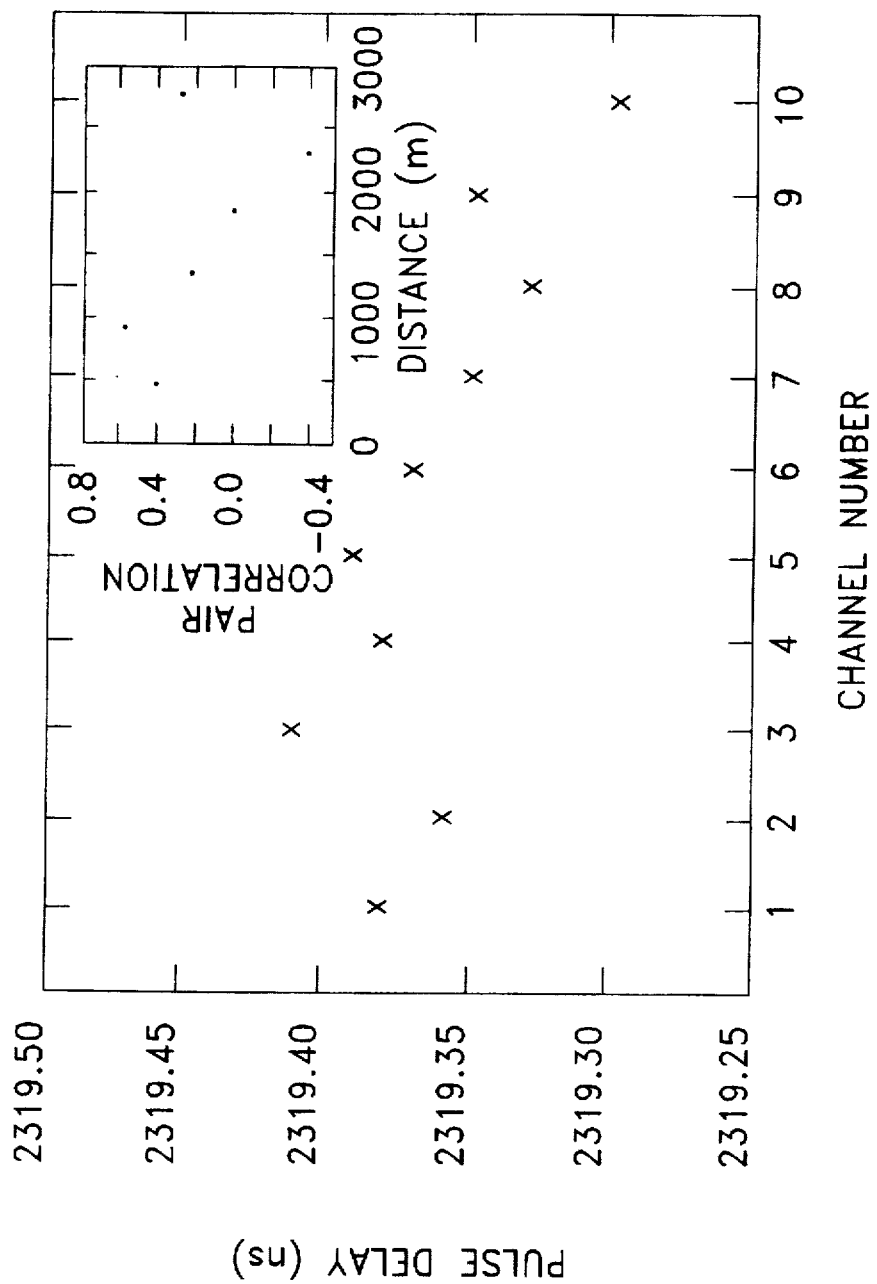
FIG. 2 is a graph depicting skew in a 10-fiber optical fiber ribbon according to the invention having edge reinforcing members.

The measured propagation delay after transmission through 461 m of a 10-fiber ribbon is shown in FIG. 2 The variation in optical pulse delay across the central 10 fibers is 110 psec or 0.24 psec/m. This value is much lower than previously reported results, and is lower than 1.0 psec/m, a current target value for commercially practicable applications. The low skew is due in part to correlation between the properties of the high quality fibers making up the ribbon. The pair correlation function $r_d$ for optical delay is shown as an insert to FIG. 2. The $-3$ dB frequency bandwidth of the fiber is limited by modal dispersion and is measured by detecting the small signal response of the fiber using an rf modulated Fabry Perot laser diode operating at wavelength $\lambda=1.3$ μm. We obtain a bandwidth of 1.78 GHz over 461 m or 821 MHz.km. With this high bandwidth it is possible to transmit data at a rate in excess of 1 Gbit/sec over a distance of at least 1 km. However, to send synchronous data 1 km over 10 parallel fibers at a rate of 1 Gbit/sec per fiber, a decision time window of at least 240 psec is needed to accommodate interchannel skew.

Figure 3:
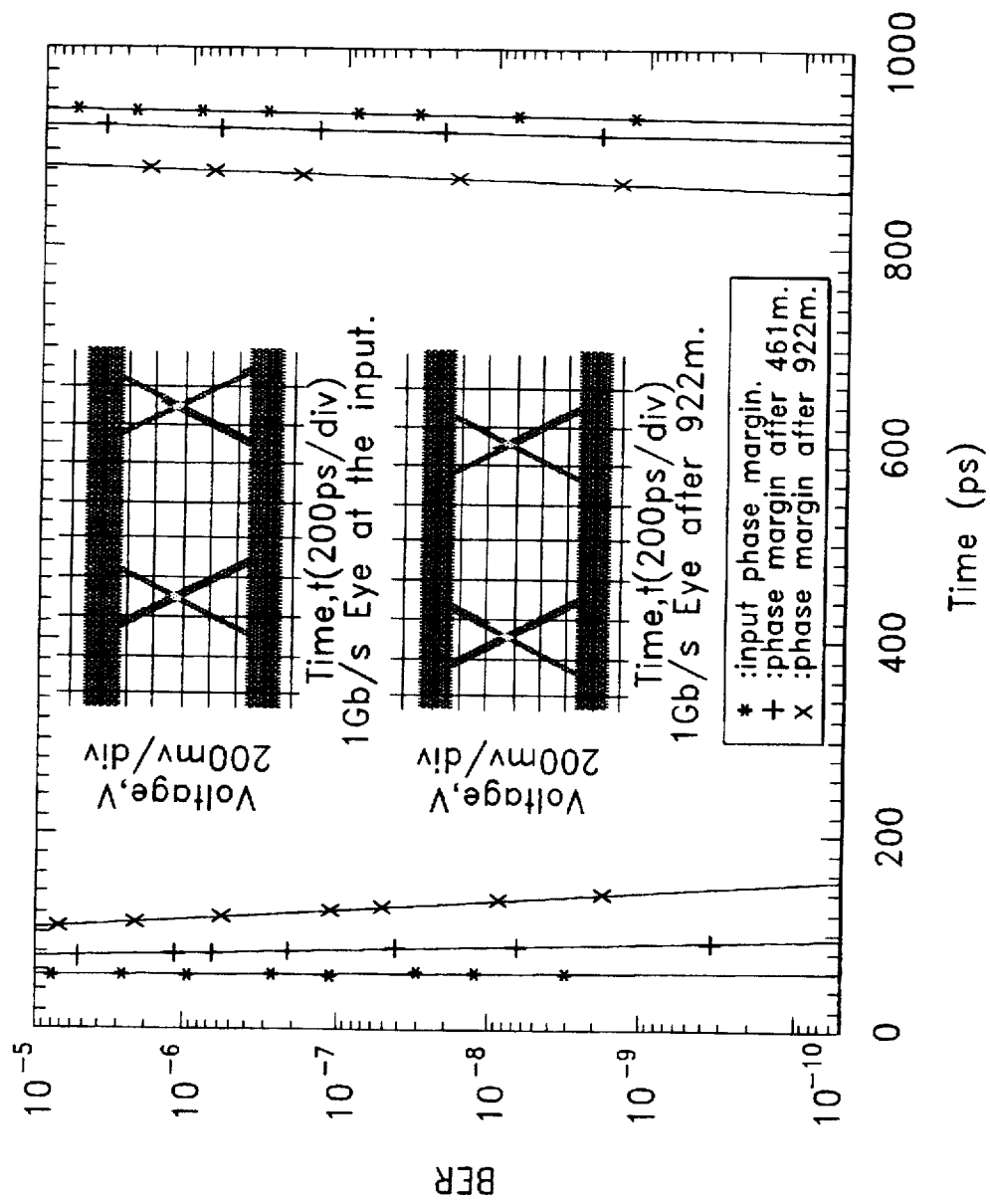
FIG. 3 is a graph of bit error rate as a function of time delay relative to the clock edge; and, FIG. 4 is a view of an optical fiber ribbon according to the invention.

Bit Error Rate (BER) experiments were performed using a 1 Gbit/sec $2^{10}-1$ non-return-to-zero (NRZ) pseudo random bit stream (PRBS). FIG. 3 shows BER as a function of time delay relative to the clock edge. The decision time window closes mainly due to the finite fiber bandwidth as well as signal attenuation due to the fiber ($-0.5$ dB/km) and 4 connectors for a total attenuation of $-1.3$ dB. After transmitting data at 1 Gbit/sec through 922 m of multimode fiber the extrapolated width of the eye at a BER of $10^{-10}$ is 700 psec. This large phase margin can easily accommodate the 240 psec/km of skew developed in the fiber ribbon. Hence, it is possible to send synchronous data at a rate greater than 1 Gbit/sec per fiber in parallel via a multimode fiber ribbon if the clock is also transmitted through one of the fibers.

If both multimode fiber ribbon skew and bandwidth of the fiber scale linearly with length of the fiber, the maximum rate, $R_{max}$, at which data can be transmitted in parallel through an n-wide fiber ribbon will be inversely related to the length, L. The aggregate data-rate distance product is $nR_{max} \times L =$ constant. For our 10-fiber ribbon this value is greater than 10 Gbit/sec.km.

Skew and bandwidth limits of fiber arise due to variations in refractive index profile during manufacture. These variations can arise due to linear variations in the composition of the preform from which the fiber is drawn, and/or variations over time in the draw process parameters. The refractive index as a function of radius r, is given by $$n(r)=n_o[1-2\Delta(r/a)^{\alpha}]^{1/2} \text{ for } r<a \text{ and}$$

$$n(r)=n_o[1-2\Delta]^{1/2} \text{ for } r>a,$$

when $n_o$ is the refractive index along the axis of the optical fiber, a is the radius of the core region, $\Delta$ is a measure of the radial change in refractive index between the core and the cladding layer and $1 \leq \alpha \leq \infty$. For 62.5 μm core diameter graded index multimode fiber, α typically equals approximately 2. For the graded index multimode fibers used in the experiments $\Delta=0.02$. The value of α maximizing, bandwidth is $\alpha_o=2-2\Delta$. If $\alpha=\alpha_o+d\alpha_r$ the impulse response width is:

$$\tau_{width}=\tfrac{1}{8}(\Delta+|d\alpha_r|/2)^2 \, n_o L/c$$

where $d\alpha_r$ the average variation of radial refractive index profile within each fiber channel. $n_o L/c$ is approximately equal to the average pulse propagation time through the fiber. The measured average impulse response width for the 461 m fiber ribbon is 258 psec giving $d\alpha_r=0.0197$.

The normalized propagation time t, for different propagating modes ignoring delay common to all modes is $$t=(c\tau/n_o L)-1=[(\alpha-2)/(\alpha+2)]\delta+[(3\alpha-2)/(\alpha+2)]\delta^2/2,$$

where τ is the total propagation time for the mode, α is the refractive index profile and δ can take values from 0 to Δ.

Assuming $\alpha=2-\beta$ where $\beta<<1$ then t may be approximated as, $$t=(-\beta/4)\delta+(\delta^2/2).$$

For each δ, there is a corresponding t which is the normalized arrival time for that mode. The range of values that t takes as δ varies gives the width of the impulse response. For $0 \leq \beta \leq 4\Delta$ the range of values t can take has a minimum. Hence, the constraint $0 \leq \beta \leq 4\Delta$ minimizes the width of the impulse response or, equivalently, maximizes the bandwidth of the fiber. In this situation, the normalized arrival time of the impulse response is $t_{ar}=-\beta^2/32$. If the refractive index profile of two fibers being compared is $\beta_1=2\Delta+d\alpha_1$ and $\beta^2=2\Delta+d\alpha_2$ respectively, then the normalized skew, $\Delta(t_{ar})$ is, $$\Delta t_{ar}=\tfrac{1}{16}[2\Delta+(d\alpha_1+d\alpha_2)/2](d\alpha_1-d\alpha_2)$$

$d\alpha_1-d\alpha_2=d\alpha_{skew}$, where $d\alpha_{skew}$ is the difference in longitudinal refractive index profile between fibers in the two channels being compared. Usually $d\alpha_{skew} \ll (d\alpha_1+d\alpha_2)/2$ so we may assume $(d\alpha_1+d\alpha_2)/2 = d\alpha_r$ where $d\alpha_r$ is the average variation of the radial refractive index from its optimal value. We can now derive a new expression for interchannel skew, $$\Delta(\tau_{ar}) = \frac{1}{16}(2\Delta + d\alpha_r)d\alpha_{skew} n_0 L/c.$$

The radial variation $d\alpha_r$ and longitudinal variation $d\alpha_{skew}$ in refractive index both contribute to skew. $d\alpha_r$ may be minimized by selecting fibers of high modal bandwidth. By forming the ribbon using fibers sequentially cut from the same pull we increase the correlation $r_d$ and minimize $d\alpha_{skew}$. In these results $d\alpha_{skew} = 0.0126$.

In the manufacture of low skew ribbons, four main parameters should be controlled: link mismatch, minimization of unequal stress being applied to the optical fibers, the use of a buffer zone for the outside fibers in the ribbon, and the furcation process.

Link mismatch may result from differences in fiber length across the optical fiber ribbon. If an optical fiber is curved along either the horizontal or vertical axis, a length difference will occur. Such curving can be minimized by controlling fiber pay-off tension and by minimizing the thickness of the coating matrix material in which the optical fibers are embedded. The resulting coating is a flat flexible member, or ribbon.

Edge stress in the optical fiber ribbonization process may be controlled by providing reinforcement members on the edges of the optical fiber ribbon. The optical fiber ribbon may comprise two reinforcing members embedded in or secured to said flat flexible member, with the optical fibers disposed between the reinforcing members. The reinforcing members may have dimensions, and materials properties such as tensile modulus, substantially similar to those of the light waveguides.

To minimize the stress being applied to the optical fibers, each optical fiber should be payed off at the same degree of tension. An electronic feedback loop and dancers for the fiber pay-off system may be used to control tensions on each optical fiber. Each optical fiber is preferably fed into the ribbonization tool at a nearly equal angle to avoid unwanted variations in stress due to feed angle differences. Such can be accomplished by the use of precision guidance techniques such as low friction ceramic pins.

The application of an appropriate stress profile may be used to eliminate the need for reinforcing members in low skew ribbon and cable.

Stresses may also arise from frictional forces as the ribbon matrix is applied to the fibers in the ribbon forming die. These forces may be controlled by supplying each optical fiber with an external coating comprising an antistatic material such as a quarternary ammonium compound, and by the use of individual fiber coatings or a common matrix material such as urethane acrylate to which a lubricant such as silicone or Teflon® material has been added. The common matrix material may have an elastic modulus of 150 to 300 Megapascals.

The usage of ionized air is another option to eliminate static effects in the ribbon tool. The ionized air is blown across the fibers along their path of travel to minimize contact between the fibers and thereby promote uniform processing stresses.

Figure 4:
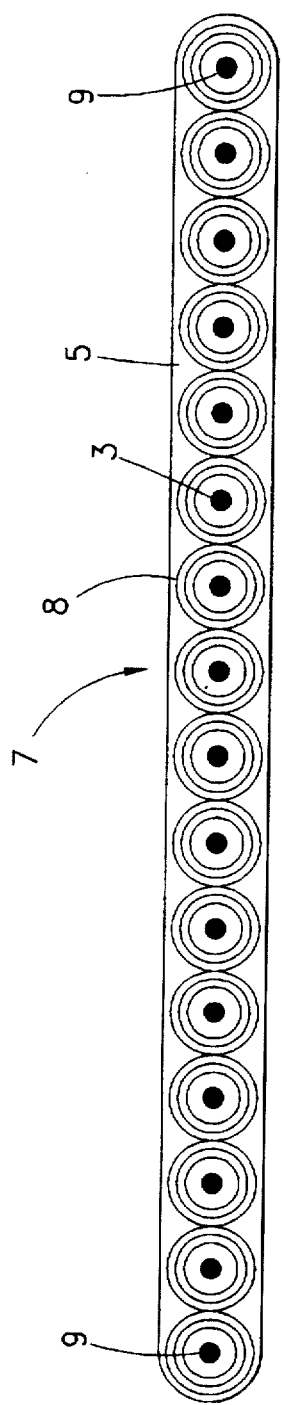
FIG. 4A is a schematic of a multifiber ribbon connector according to the invention.

An optical fiber ribbon 7 according to one embodiment of the present invention as shown in FIG. 4 includes optical fibers 3 each having an external coating 8 of antistatic material and surrounded by a common matrix coating 5 formed of urethane acrylate material. The fourteen optical fibers 3 are arranged side-by-side between outer reinforcing members 9, which are preferably low quality optical fibers not suitable for data transmission. Reinforcing members 9 may be formed of the same material as that forming optical fibers 3, such as a silica glass, and having similar dimensions and mechanical properties, such as tensile modulus.

Figure 4A:
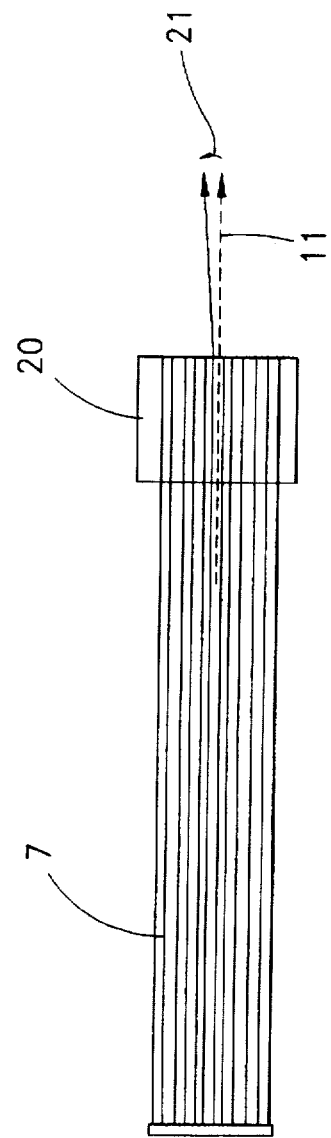

In the furcation process, as depicted in FIG. 4A, the ribbon connector 20 is preferable applied perpendicular to the axis 11 of the optical fiber ribbon 7. For example, even a two degree offset 21 in each of two connectors for a 24-fiber ribbon can result in a worst case skew of around 2 psec solely due to the effect of the offset.

Utilizing the present invention skew of less than 0.25 psec/m can be achieved across a 10-fiber ribbon of multimode graded index fibers. The ribbon preferably comprises high modal bandwidth (corresponding to small $d\alpha_r$), a characteristically low $d\alpha_{skew}$ and minimal stress from the ribbonization process. Our experimental results extend the practical applications of multimode fiber ribbon to include synchronous parallel transmissions with an aggregate data-rate×distance product of greater than 10 Git/sec.km. Substantially similar results are achievable with the use of single-mode optical fibers. As used herein, single-mode optical fibers are designed to have single-mode transmission at an operating wavelength of 1300 nm.

It is to be understood that the invention is not limited to the exact details of the construction, operation, exact materials, or embodiments shown and described, as modifications and equivalents will be apparent to one skilled in the art without departing from the scope of the invention.

What is claimed is:

1. An optical fiber ribbon comprising a plurality of optical fibers, said optical fibers being secured or embedded substantially parallel to one another, wherein said fibers are selected and secured or embedded such that the skew in optical propagation time for signals transmitted over said plurality of optical fibers is less than 1.0 psec/m.

2. The optical fiber ribbon of claim 1, wherein said optical fibers are selected from the same pull.

3. The optical fiber ribbon of claim 1, wherein each of said optical fibers is multimode and has a modal bandwidth greater than or equal to 800 Mhz.km at an operating wavelength of 1300 nm.

4. The optical fiber ribbon of claim 1, wherein each of said optical fibers is single-mode, at an operating wavelength of 1300 nm.

5. The optical fiber ribbon of claim 1, further comprising at least one reinforcing member secured or embedded on either side of said plurality of optical fibers, wherein said at least one reinforcing member comprises a secondary optical fiber having dimensions and tensile modulus substantially similar to that of said plurality of optical fibers.

6. The optical fiber ribbon of claim 1, further comprising an external coating on each optical fiber comprising an antistatic material, said antistatic material comprising a quarternary ammonium compound.

7. The optical fiber ribbon of claim 1, wherein said plurality of optical fibers are subjected to controlled payoff stress during ribbon formation to compensate for stress-induced effects due to ribbon formation, cabling and handling.

8. The optical fiber ribbon of claim 1, further comprising at least one multi-fiber connector attached to the end of said ribbon, wherein the offset between the axis of said ribbon and the axis of said at least one connector is less than two degrees.

9. An optical fiber ribbon comprising a plurality of optical fibers, said optical fibers being secured or embedded substantially parallel to one another, wherein said optical fibers are selected from the same pull to minimize the skew in optical propagation time for signals transmitted over said plurality of optical fibers, further comprising an external coating on each optical fiber comprising an antistatic material, said antistatic material comprising a quarternary ammonium compound.

10. An optical fiber ribbon comprising a plurality of optical fibers, said optical fibers being secured or embedded substantially parallel to one another, wherein said optical fibers are selected from the same pull to minimize the skew in optical propagation time for signals transmitted over said plurality of optical fibers, further comprising at least one multi-fiber connector attached to the end of said ribbon wherein the offset between the axis of said ribbon and the axis of said at least one connector is less than two degrees.

11. An optical fiber ribbon comprising a plurality of optical fibers, said optical fibers being secured or embedded substantially parallel to one another, wherein said optical fibers are selected from the same pull to minimize the skew in optical propagation time for signals transmitted over said plurality of optical fibers, and wherein each of said optical fibers is multimode and has a modal bandwidth greater than or equal to 800 Mhz.km at an operating wavelength of 1300 nm.

12. The optical fiber ribbon of claim 11, further comprising at least one reinforcing member secured or embedded on either side of said plurality of coated optical fibers, wherein said at least one reinforcing member comprises a secondary optical fiber having dimensions and tensile modulus substantially similar to that of said plurality of optical fibers.

13. The optical fiber ribbon of claim 11, wherein said plurality of optical fibers are subjected to controlled payoff stress during ribbon formation to compensate for stress-induced effects due to ribbon formation, cabling and handling.

14. The optical fiber ribbon of claim 11, further comprising at least one multi-fiber connector attached to the end of said ribbon, wherein the offset between the axis of said ribbon and the axis of said at least one connector is less than two degrees.

15. An optical fiber ribbon comprising a plurality of optical fibers, said optical fibers being secured or embedded substantially parallel to one another, wherein said optical fibers are selected from the same pull to minimize the skew in optical propagation time for signals transmitted over said plurality of optical fibers, and wherein each of said optical fibers is multimode and has a modal bandwidth greater than or equal to 800 MHz.km at an operating wavelength of 1300 nm, further comprising an external coating on each optical fiber comprising an antistatic material, said antistatic material comprising a quarternary ammonium compound.

* * * * *